US011057362B2

(12) United States Patent
Segu et al.

(10) Patent No.: US 11,057,362 B2
(45) Date of Patent: Jul. 6, 2021

(54) ADAPTIVE SELECTION OF AUTHENTICATION SCHEMES IN MFA

(71) Applicant: CA, Inc., New York, NY (US)

(72) Inventors: Murali Krishna Segu, Hyderabad (IN); Venkata Swamy Karukuri, Hyderabad (IN)

(73) Assignee: CA, Inc., New York, NY (US)

( * ) Notice: Subject to any disclaimer, the term of this patent is extended or adjusted under 35 U.S.C. 154(b) by 131 days.

(21) Appl. No.: 15/725,536

(22) Filed: Oct. 5, 2017

(65) Prior Publication Data
US 2019/0109833 A1 Apr. 11, 2019

(51) Int. Cl.
*H04L 29/06* (2006.01)
(52) U.S. Cl.
CPC ............. *H04L 63/08* (2013.01); *H04L 63/10* (2013.01); *H04L 63/205* (2013.01); *H04L 2463/082* (2013.01)
(58) Field of Classification Search
CPC ... H04L 63/08; H04L 63/10; H04L 2463/082; H04L 63/205
See application file for complete search history.

(56) References Cited

U.S. PATENT DOCUMENTS

| 2009/0193514 | A1* | 7/2009 | Adams | G06F 21/32 |
| | | | | 726/17 |
| 2011/0202755 | A1* | 8/2011 | Orsini | G06F 21/602 |
| | | | | 713/151 |
| 2011/0246766 | A1* | 10/2011 | Orsini | G06F 21/6218 |
| | | | | 713/160 |
| 2013/0133055 | A1* | 5/2013 | Ali | H04W 12/06 |
| | | | | 726/7 |
| 2015/0113602 | A1* | 4/2015 | Korman | G06F 21/44 |
| | | | | 726/4 |
| 2015/0326613 | A1* | 11/2015 | Devarajan | H04L 61/2007 |
| | | | | 726/1 |
| 2015/0349966 | A1* | 12/2015 | Dimitrakos | H04L 63/0838 |
| | | | | 713/168 |
| 2015/0381621 | A1* | 12/2015 | Innes | H04L 9/321 |
| | | | | 726/7 |
| 2016/0142398 | A1* | 5/2016 | Lin | H04L 63/0876 |
| | | | | 726/7 |
| 2016/0381080 | A1* | 12/2016 | Reddem | G06F 21/31 |
| | | | | 726/1 |

(Continued)

*Primary Examiner* — Cheng-Feng Huang
(74) *Attorney, Agent, or Firm* — Morgan, Lewis & Bockius LLP (57) ABSTRACT

A method of dynamic adaptive authentication includes receiving a request from a user to access a resource of a network and determining whether the resource is protected. In response to determining that the resource is protected, a dynamic authentication chain is generated. The dynamic authentication chain includes a plurality of authentication schemes that are arranged in a particular order. The method also includes challenging the user with the dynamic authentication chain and receiving a set of credentials from the user based at least in part on the particular order of the dynamic authentication chain. The method includes determining whether the set of credentials satisfies the dynamic authentication chain. In response to determining that the set of credentials satisfies the dynamic authentication chain, the user is authenticated.

18 Claims, 5 Drawing Sheets

(56) References Cited

U.S. PATENT DOCUMENTS

| | | | |
|---|---|---|---|
| 2017/0063931 A1* | 3/2017 | Seed | H04L 63/10 |
| 2017/0237727 A1* | 8/2017 | Kapoor | H04L 63/083 |
| | | | 726/4 |
| 2018/0007049 A1* | 1/2018 | Palki | H04L 63/08 |
| 2018/0265095 A1* | 9/2018 | Joe | B60K 28/06 |
| 2018/0367526 A1* | 12/2018 | Huang | G06F 21/31 |

* cited by examiner

ADAPTIVE SELECTION OF AUTHENTICATION SCHEMES IN MFA

BACKGROUND

The present disclosure relates to adaptive authentication for determining the authentication scheme from an authentication chain list.

In general, authentication chaining provides a fixed set of authentication schemes that satisfy selected criteria to successfully authenticate to accept or reject a user. It can often be tedious and confusing to administrators to determine what scheme should be used with which criterion. An authentication chain is usually a set of authentication schemes that have been configured with a set of rules based on risk factor or risk score given from client-side data. Typical authentication systems generally rely on client side data or browser information for calculating a risk score for multi-factor authentication (MFA). Since each criterion has its own level of authentication security, it is equally or more important what authentication scheme is being used as a link in an authentication chain.

BRIEF SUMMARY

According to an aspect of the present disclosure, a method may include the steps of receiving a request from a user to access a resource of a network; determining whether the resource is protected; in response to determining that the resource is protected, generating a dynamic authentication chain comprising a plurality of authentication schemes arranged in a particular order; challenging the user with the dynamic authentication chain; receiving a set of credentials from the user based at least in part on the particular order of the dynamic authentication chain; determining whether the set of credentials satisfies the dynamic authentication chain; and authenticating the user in response to determining that the set of credentials satisfies the dynamic authentication chain.

According to another aspect of the present disclosure, a non-transitory computer-readable storage medium may have instructions stored thereon that may be executable by a computing system to: receive a request from a user to access a resource of a network; determine whether the resource is protected; in response to determining that the resource is protected, generate a dynamic authentication chain comprising a plurality of authentication schemes arranged in a particular order; challenge the user with the dynamic authentication chain; receive a set of credentials from the user based at least in part on the particular order of the dynamic authentication chain; determine whether the set of credentials satisfies the dynamic authentication chain; and authenticate the user in response to determining that the set of credentials satisfies the dynamic authentication chain.

According to another aspect of the present disclosure, a computer system may include a server configured to: receive a request from a user to access a resource of a network; determine whether the resource is protected; in response to determining that the resource is protected, generate a dynamic authentication chain comprising a plurality of authentication schemes arranged in a particular order; challenge the user with the dynamic authentication chain; receive a set of credentials from the user based at least in part on the order of the dynamic authentication chain; determine whether the set of credentials satisfies the dynamic authentication chain; and authenticate the user in response to determining that the set of credentials satisfies the dynamic authentication chain.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium comprising, but not limited to, wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to infrastructure management, systems and methods disclosed herein may be related to other areas beyond network infrastructure. Systems and methods disclosed herein may be related to, and used by, any predictive system that utilizes expert learning or other predictive methods. Systems and methods disclosed herein may be applicable to a broad range of applications that, such as, for example, research activities (e.g., research and design, development, collaboration), commercial activities (e.g., sales, advertising, financial evaluation and modeling, inventory control, asset logistics and scheduling), IT systems (e.g., computing systems, cloud computing, network access, security, service provisioning), medicine (e.g., diagnosis or prediction within a particular specialty or sub-specialty), and other activities of importance to a user or organization.

Although multi-factor authentication is common, it is often carried out through pre-determined or pre-configured authentication schemes. Typically, only client-side information, such as user history from a web browser, will be analyzed by an algorithm to decide the pre-determined or pre-configured authentication chain.

In view of the foregoing, a need has arisen for adaptive authentication to intelligently and dynamically select and determine the authentication schemes from a predefined set of authentication schemes.

Figure 1:
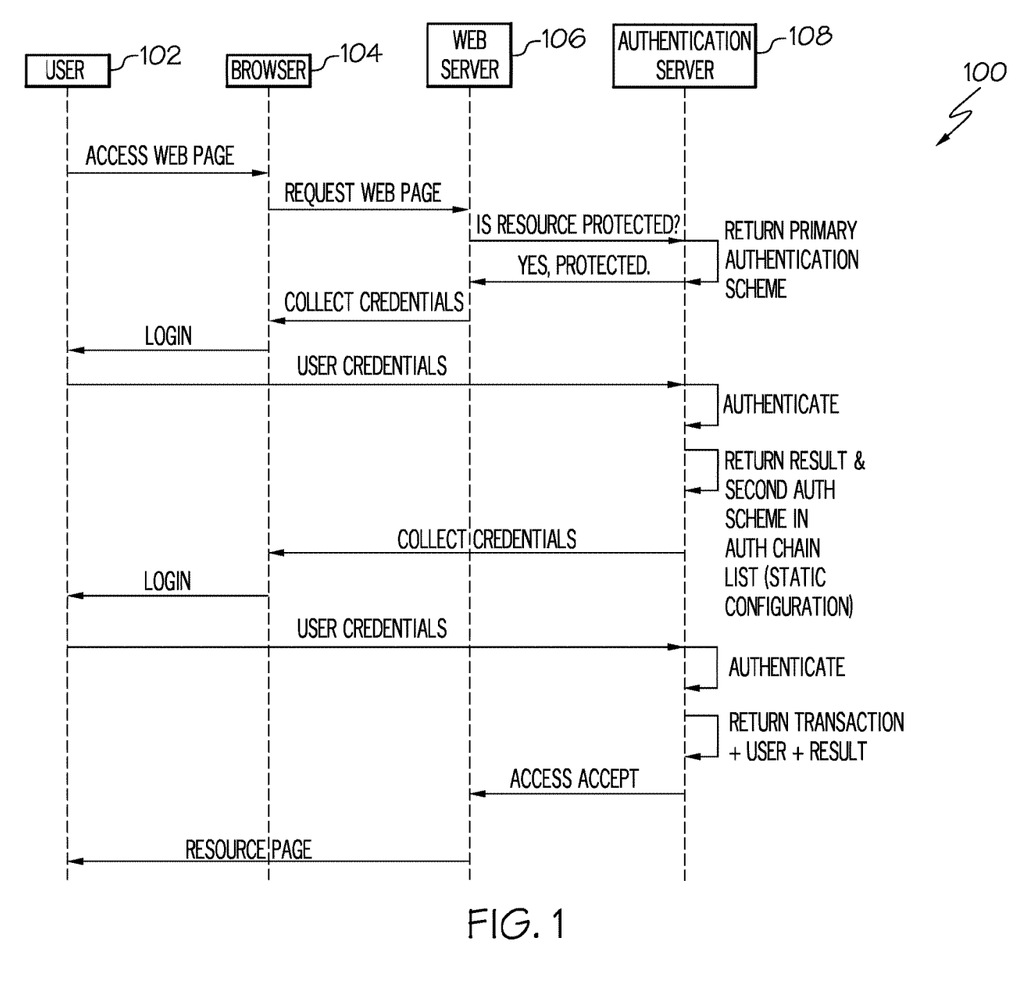
FIG. 1 illustrates a schematic representation of a sequence without adaptive authentication chaining.

In a sequence without adaptive authentication chaining, for example as depicted by sequence 100 in FIG. 1, a user 102 may access a web page. The browser 104 may convey the request to a web server 106. The web server 106 may then query an authentication server 108 to determine if the resource (i.e., web page) is protected. The authentication server 108 may return a primary authentication scheme along with a response that yes, the resource is protected. The web server 106 may collect credentials from the browser 104, which requires the user 102 to login. The user credentials may then be sent to the authentication server 108, which may authenticate the credentials. The authentication server 108 may return a result along with a second authentication scheme in an authentication chain list. This authentication chain list may be formed in accordance with a static configuration of authentication schemes. In this example, the static configuration may be two authentication schemes during the start-up of the authentication server. The authentication server 108 may then collect credentials from the browser 104, which may require the user 102 to login. The user credentials may then be sent to the authentication server 108 to authenticate. The authentication server 108 may return the transactions and result to user 102 and may convey to web server 106 that access is accepted. The web server 106 may then provide the resource page to the user 102.

Figure 2:
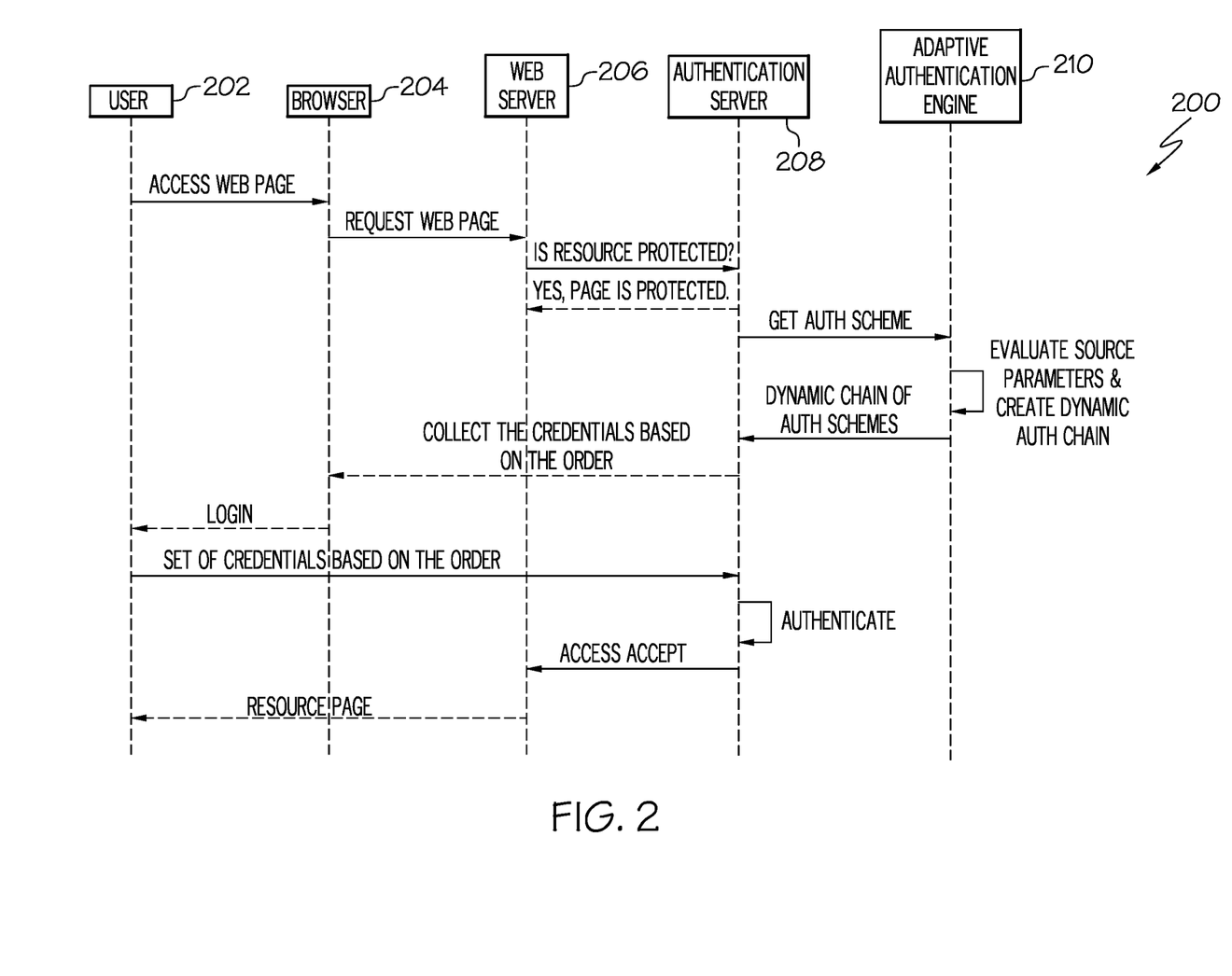
FIG. 2 illustrates a schematic representation of a sequence with adaptive authentication chaining.

In a sequence with adaptive authentication chaining, for example as depicted by sequence 200 in FIG. 2, a user 202 may request access to a web page from a browser 204. The browser 204 may convey the request to a web server 206. The web server 206 may query a smart authentication server 208 to determine whether the resource is protected. The smart authentication server 208 may respond to the web server 206 that the web page is protected and may query an adaptive authentication engine 210 to get an authentication scheme. The adaptive authentication engine 210 may evaluate source parameters and create a dynamic authentication scheme chain based on user information, policies, geographic location, etc. The source parameters evaluated by the adaptive authentication engine 210 may be obtained from the server-side, not the client-side, i.e. browser information. The dynamic authentication scheme chain may include any suitable number and type of authentication scheme depending on the level of protection of the resource and the necessary level of authentication security. Evaluation of the source parameters provides information necessary for the engine 210 to determine the level of protection and authentication security. The engine 210 may define an order in which the authentication schemes should be presented to the user. The engine 210 may dynamically select the number, type, and order of the authentication schemes placed in the dynamic authentication chain.

The adaptive authentication engine 210 may return the dynamic chain of authentication schemes to the smart authentication server 208. The smart authentication server 208 may collect user credentials in response to the chain, based on the order of the authentication schemes in the dynamic authentication chain. The browser 204 may require the user 202 to login. The user 202 may provide the set of user credentials based on the order of the dynamic chain of authentication schemes presented to the user to the smart authentication server 208. The smart authentication server 208 may authenticate, let the web server 206 know to accept access, and the web server 206 may provide the resource page to the user 202.

In creating the dynamic chain of authentication schemes, the embodiment of FIG. 2 may use an algorithm to dynamically decide which authentication schemes should be included in the chain and in what order, and then challenge a user based upon that dynamically generated chain. The algorithm may analyze user information gathered from a server, including user access history, role specific access information, and privilege access control in order to determine the risk in providing a user with access to a protected resource. The system of FIG. 2 may consider these types of user information in a cumulative fashion. For example, the user history may be considered first, and the authentication chain may be adapted to any changes in user behavior. However, any request for credentials sent via the authentication chain is based on the above three criteria being evaluated. Each criterion depends on the level of authentication security. The three criteria may be considered in any suitable order to evaluate the risk of providing the user with access to the protected resource.

Well known authentication criteria include required, requisite, sufficient, and optional. An authentication scheme which is marked with 'required' criteria means a user needs to succeed in authentication, and whether an authentication succeeds or fails, the process still continues down the authentication schemes in the chain for each realm. An authentication scheme which is marked with 'requisite' criteria means a user needs to get authenticated with all the authentication schemes in the chain in order to attain access to the protected resource; this is similar to 'AND' logic and failure of any authentication scheme in the chain will deny access to the protected resource. An authentication scheme which is marked with 'sufficient' criteria means: a user needs to get authenticated with at least one of the authentication schemes in the chain to attain access to the protected resource; this is similar to 'OR' logic and the failure of all authentication schemes configured in the chain will deny access to the protected resource. An authentication scheme which is marked with 'optional' criteria means user authentication is not required to succeed and whether an authentication succeeds or fails, the process still continues down the authentication chain list. In dynamically generating the authentication chain, the set of authentication schemes dynamically selected to be in the chain may be assigned particular criteria, such as the required, requisite, sufficient, and optional criteria discussed above, depending on the security or level of protection of a resource being accessed by a user.

In providing adaptive authentication chaining, risk of providing access to the resource may be assessed based on user history and other server side parameters. An efficiency authentication scheme for fallback/two-factor authentication may be identified based on user access history, role specific access configuration, and privilege access control system for delegated users. The process may adapt to re-challenge with stronger authentication schemes when a user is seeking to access highly sensitive resources. Possible responses from the system may include reject access to very sensitive realms or send 'strong auth request' from the list of authentication chaining.

An authentication scheme with its importance may be denoted Si. An authentication scheme that is allowed to fallback may be denoted Scf. Authentication schemes that are in fallback list may be denoted Sfl. A transaction (T) with result success may be denoted Ts, and with result failure may be denoted as Tf. Information about protection and significance level of a resource may be obtained. A system may then obtain details from a server regarding user access history, user role privileges, and delegated roles. This information may then be inputted to Decision Tree algorithm for classification, and thereby determine the resource sensitivity and whether the user has to be provided with access, denied access, or re-challenged. This information may be sufficient to adapt to the real-time protection of the resource.

The resource being accessed by a user and protected may be a URL or other application. The resource to be protected may be identified along with its significance level (Rs). An authentication scheme with its importance may be denoted Si. An authentication scheme that is allowed to fallback may be denoted Scf. Authentication schemes that are in fallback list may be denoted Sfl. A transaction (T) with result success may be denoted Ts, and with result failure may be denoted as Tf. Information about protection and significance level of a resource may be obtained. A system may then obtain details from a server regarding user access history, user role privileges, and delegated roles. This information may then be inputted to a Decision Tree or other algorithm for classification, and thereby determine the resource sensitivity and whether the user has to be provided with access, denied access, or re-challenged. This information may be sufficient to adapt to the real-time protection of the resource. The algorithm may be any suitable authentication algorithm, but the input parameters to the algorithm are server-side parameters, including user access history, user role privileges, and delegated roles.

Figure 3:
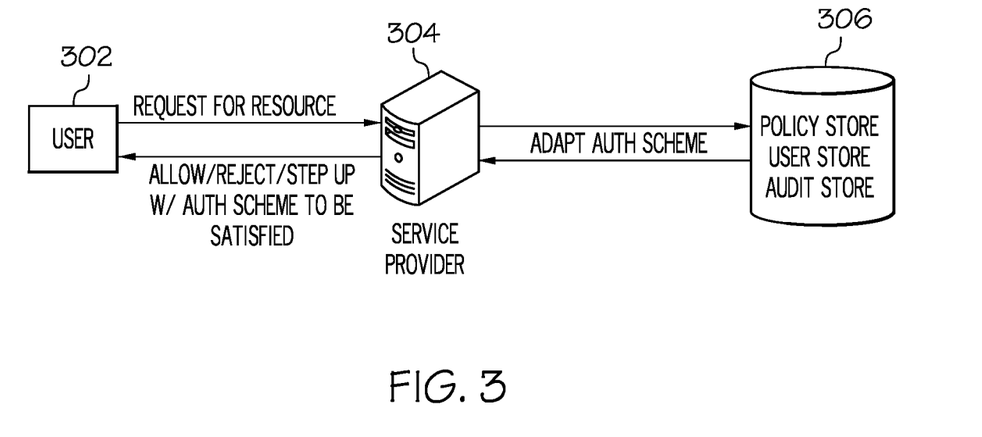
FIG. 3 illustrates a diagram of adaptive authentication chaining.

FIG. 3 depicts an example of an adaptive authentication chaining system. A user 302 may request a resource. The request may be sent to a service provider 304. The service provider 304 may communicate with a store 306, such as a policy store, user store, or audit store. A server may compute a score or risk score using user access history, role specific configuration, and delegated user identity privileges. The server may adapt to the authentication scheme from the authentication chaining. The store 306 may respond with allow/reject/step up. The service provider 304 may send a response to user 302 of allow or reject or step up, along with the authentication scheme to be satisfied. The store 306 may be available to provide an authentication mechanism and verification.

Decision tree algorithms exist for classification of resources. A decision tree algorithm may have an input of decision tree and input database and an output of model prediction. Any suitable decision tree algorithm may be used. According to the present invention, the inputs to the decision tree may include server-side parameters, such as user access history, role specific access, privilege access control. For example, Decision Tree Algorithm:
For each t belongs D do
n=root of T;
While n not leaf node do
Obtain answer to question on n applied t;
Identify arc from i which contains correct answer;
N=node at end of the arc;
Make prediction for t based on labeling of n.

Figure 4:
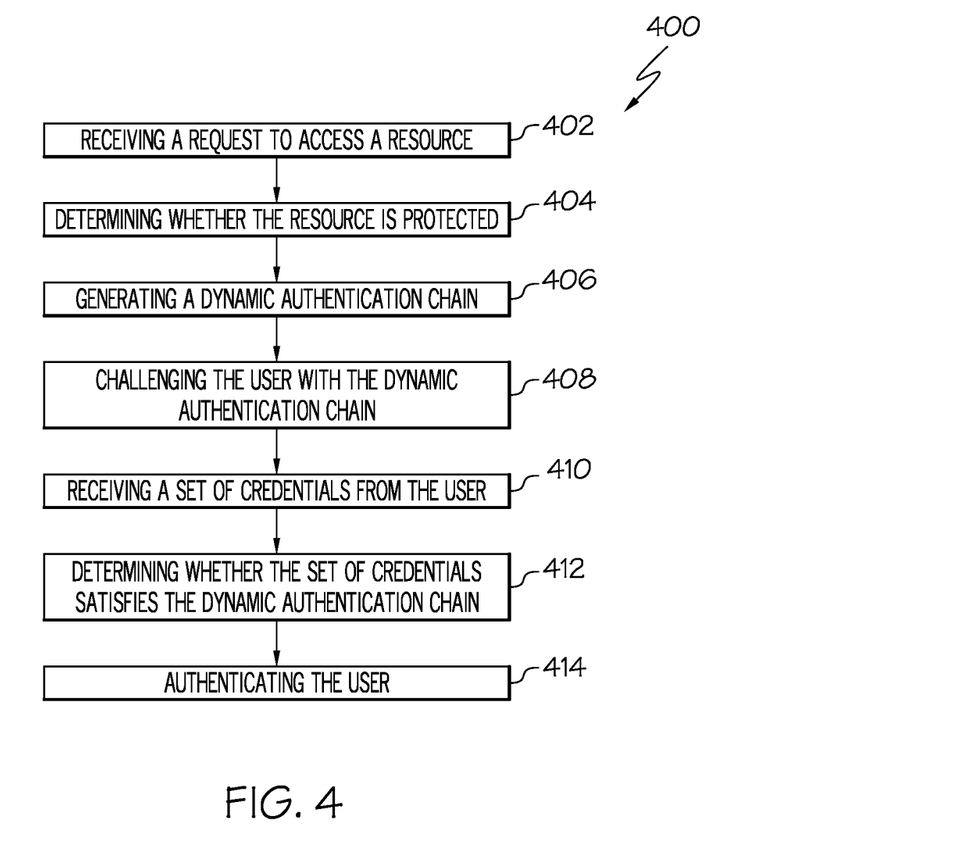
FIG. 4 illustrates a flow chart for an embodiment of providing adaptive authentication chaining.

Referring now to FIG. 4, a flow diagram of a process 400 for adaptive authentication chaining is depicted. At step 402, a request to access a resource is received by a server from a user. At step 404, a determination of whether the resource is protected is made. Determining whether the resource is protected may also include determining the level of protection or authentication security required for that particular resource (e.g., based on the resource's assigned significance level). In response to determining that the resource is protected, a dynamic authentication chain is generated at step 406. The dynamic authentication chain includes a plurality of authentication schemes and the schemes are arranged in a particular order in the chain. Both the plurality of schemes and the particular order are dynamically selected as the dynamic authentication chain is generated. In dynamically selecting the schemes and order of the chain, user access history, role specific access, privilege access control, or other server-side parameters may be evaluated. Each authentication scheme placed in the dynamic authentication chain may be assigned a particular criterion (e.g., required, requisite, sufficient, optional). The dynamic authentication chain may include any suitable number of authentication schemes with any suitable properties (e.g., required v. requisite, fallback, etc.) depending on the resource being accessed and the desired level of security defined by the user or the system for that resource.

At step 408, the user is challenged with the dynamic authentication chain. Challenging the user may involve receiving a user response to the schemes within the dynamic authentication chain, such as entering a password or entering a number from a disconnected token generator, or other suitable responses to an authentication scheme. The schemes are presented to the user in the order the schemes were dynamically arranged in the chain. The server receives a set of credentials from the user at step 410 based on the user's responses to the authentication schemes in the dynamic authentication chain. At step 412, a determination of whether the set of credentials satisfies the dynamic authentication chain is made. Whether the user credentials satisfy the chain depends on the criterion assigned to the schemes within the chain and the user's responses to the particular schemes (e.g., if a scheme within the chain has a 'required' criteria, then the failure of any authentication scheme in the chain will result in denying access). In response to determining that the set of credentials does satisfy the dynamic authentication chain, the user is authentication at step 414. Whether the set of credentials satisfies the dynamic authentication chain may depend on the particular criteria of the types of schemes and the order of the schemes within the chain, such as whether the schemes were assigned to be requisite, required, sufficient, or optional, as discussed above.

Figure 5:
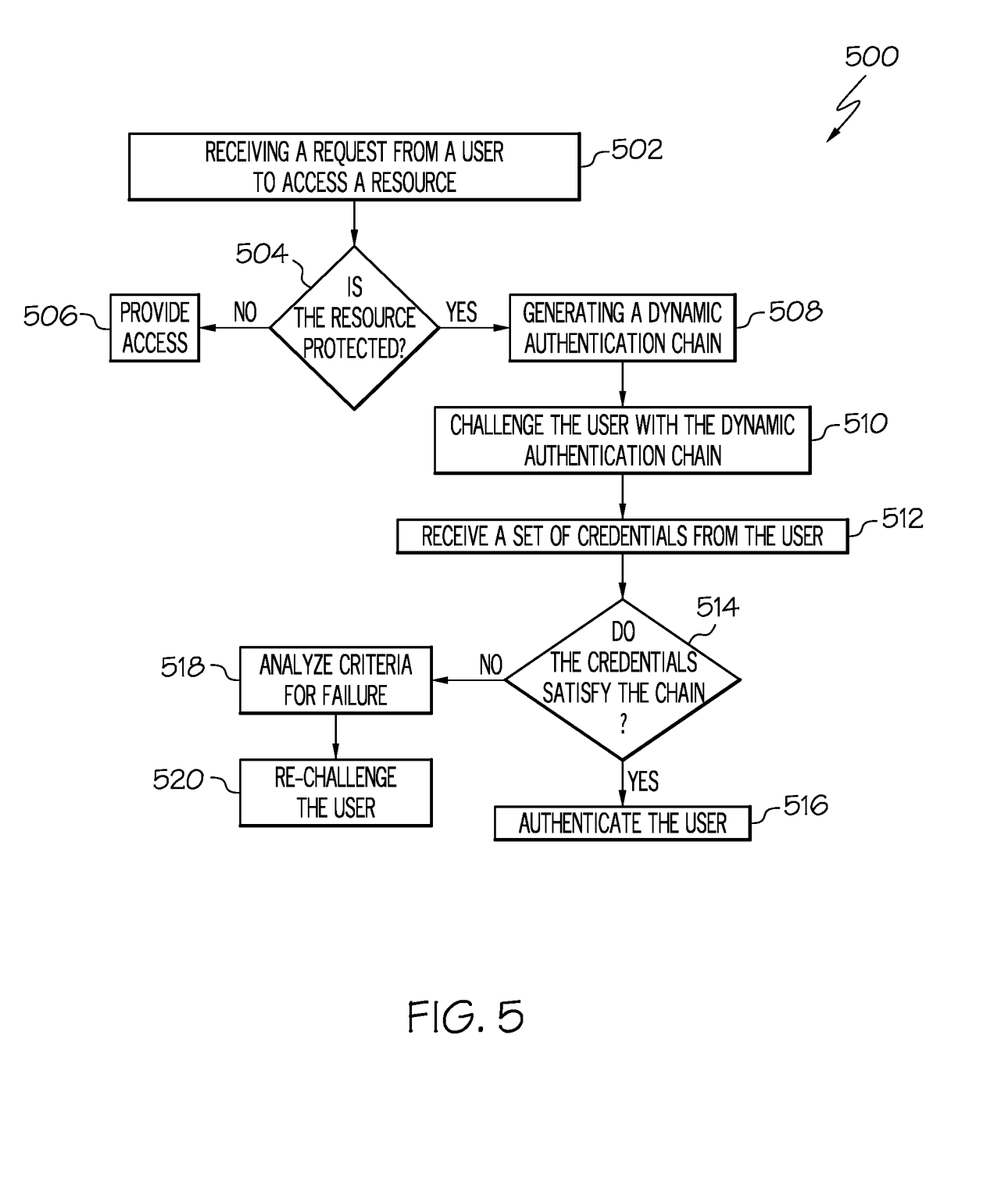
FIG. 5 illustrates a flow chart for an embodiment of providing adaptive authentication chaining.

Referring now to FIG. 5, a flow diagram of a process 500 for adaptive authentication chaining is depicted. At step 502, a request from a user to access a resource is received. The server then determines whether the resource is protected at step 504. Determining whether the resource is protected may also include determining the level of protection or authentication security required for that particular resource. If the resource is not protected, the user is provided access to the resource at step 506. If the resource is protected, then in response to that determination, a dynamic authentication chain is generated at step 508. The dynamic authentication chain includes a plurality of authentication schemes and the schemes are arranged in a particular order in the chain. Both the plurality of schemes and the particular order are dynamically selected as the dynamic authentication chain is generated. In dynamically selecting the schemes and order of the chain, user access history, role specific access, privilege access control, or other server-side parameters may be evaluated. Each authentication scheme placed in the dynamic authentication chain may be assigned a particular criterion (e.g., required, requisite, sufficient, optional). The dynamic authentication chain may include any suitable number of authentication schemes with any suitable properties (e.g., required v. requisite, fallback, etc.) depending on the resource being accessed and the desired level of security defined by the user or the system for that resource.

At step 510, the user is challenged with the dynamic authentication chain. Challenging the user may involve receiving a user response to the schemes within the dynamic authentication chain, such as entering a password or entering a number from a disconnected token generator, or other suitable responses to an authentication scheme. The schemes are presented to the user in the order the schemes were dynamically arranged in the chain. A set of credentials from the user is received at step 512 based on the user's responses to the authentication schemes in the dynamic authentication chain. At step 514, the server determines whether the credentials satisfy the dynamic authentication chain. Whether the user credentials satisfy the chain depends on the criterion assigned to the schemes within the chain and the user's responses to the particular schemes (e.g., if a scheme within the chain has a 'required' criteria, then the failure of any authentication scheme in the chain will result in denying access). If the credentials do satisfy the dynamic authentication chain, the user is authenticated at step 516. If the credentials do not satisfy the dynamic authentication chain, the user is not authenticated and criteria are analyzed for failure at step 518. Whether the set of credentials satisfies the dynamic authentication chain may depend on the particular criteria of the types of schemes and the order of the schemes within the chain, such as whether the schemes were assigned to be requisite, required, sufficient, or optional, as discussed above. At step 520, the user may be re-challenged with additional authentication schemes. The re-challenging may be conducted in any suitable manner, including generating another dynamic authentication chain in the manner described above, but with stronger authentication schemes. The dynamic authentication chain may include any suitable number of authentication schemes with any suitable properties (e.g., required v. requisite, fallback, etc.) depending on the resource being accessed and the desired level of security defined by the user or the system for that resource.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
   receiving a request from a user to access a resource of a network;
   determining whether the resource is protected;
   in response to determining that the resource is protected, generating, based on evaluation of a plurality parameters of the resource, a dynamic authentication chain comprising a plurality of authentication schemes arranged in a particular order;
   wherein the plurality of authentication schemes and the particular order are dynamically selected as the dynamic authentication chain is being generated;
   challenging the user with the dynamic authentication chain in a single login;
   receiving a set of credentials from the user based at least in part on the particular order of the dynamic authentication chain in response to the single login request;
   determining whether the set of credentials satisfies the dynamic authentication chain;
   authenticating the user in response to determining that the set of credentials satisfies the dynamic authentication chain;
   adapting to re-challenge the user with a stronger authentication scheme when a highly protected resource is being accessed; and
   analyzing criteria for failure and re-challenging the user in response to determining that the set of credentials fails to satisfy the dynamic authentication chain.

2. The method of claim 1, wherein generating the dynamic authentication chain further comprises dynamically selecting the plurality of authentication schemes to be included in the dynamic authentication chain.

3. The method of claim 2, wherein the plurality of authentication schemes are dynamically selected from a pre-defined list of authentication schemes.

4. The method of claim 2, wherein generating the dynamic authentication chain further comprises:
   dynamically selecting the particular order in which the plurality of authentication schemes are arranged in the dynamic authentication chain using user access history parameters from a server side.

5. The method of claim 2, wherein a plurality of source parameters of the user comprises at least one of user access history, role specific access, or privilege access control and further comprising dynamically selecting the dynamic authentication chain and dynamically selecting the particular order based upon the source parameters and in response to determining that the resource is protected.

6. The method of claim 1, wherein analyzing criteria for failure and re-challenging the user is performed in a new single login request based on a pre-defined list of authentication schemes.

7. A non-transitory computer-readable storage medium comprising computer-executable instructions carried on the computer-readable storage medium, the instructions readable by a processor and, when read and executed, configured to cause the processor to:
   receive a request from a user to access a resource of a network;
   determine whether the resource is protected;
   in response to determining that the resource is protected, generate, based on evaluation of a plurality of resource parameters, a dynamic authentication chain comprising a plurality of authentication schemes arranged in a particular order;
   wherein the plurality of authentication schemes and the particular order are dynamically selected as the dynamic authentication chain is being generated;
   challenge the user with the dynamic authentication chain in a single login request;
   receive a set of credentials from the user based at least in part on the particular order of the dynamic authentication chain in response to the login request;
   determine whether the set of credentials satisfies the dynamic authentication chain;
   authenticate the user in response to determining that the set of credentials satisfies the dynamic authentication chain;
   adapt to re-challenge the user with a stronger authentication scheme when a highly protected resource is being accessed; and
   analyze criteria for failure and re-challenge the user in response to determination that the set of credentials fails to satisfy the dynamic authentication chain.

8. The non-transitory computer-readable storage medium of claim 7, wherein the instruction readable by a processor and, when read and executed, configured to cause the processor to generate the dynamic authentication chain further comprises:
   evaluate a plurality of source parameters of the user; and
   dynamically select the plurality of authentication schemes to be included in the dynamic authentication chain.

9. The non-transitory computer-readable storage medium of claim 8, wherein the plurality of authentication schemes are dynamically selected from a pre-defined list of authentication schemes.

10. The non-transitory computer-readable storage medium of claim 7, wherein the instruction readable by a processor and, when read and executed, configured to cause the processor to generate the dynamic authentication chain further comprises: dynamically select the particular order in which the plurality of authentication schemes are arranged in the dynamic authentication chain.

11. The non-transitory computer-readable storage medium of claim 7, wherein a plurality of source parameters of the user comprises at least one of user access history, role specific access, or privilege access control.

12. The non-transitory computer-readable storage medium of claim 7, wherein the instructions further comprise: analyze criteria for failure and re-challenging the user in a new single login request based on a pre-defined list of authentication schemes in response to determining that the set of credentials fail to satisfy the dynamic authentication chain.

13. A computer system comprising:
a server comprising a hardware processor configured to:
  receive a request from a user to access a resource of a network;
  determine whether the resource is protected;
  in response to determining that the resource is protected, generate, based on evaluation of a plurality of resource parameters, a dynamic authentication chain comprising a plurality of authentication schemes arranged in a particular order;
  wherein the plurality of authentication schemes and the particular order are dynamically selected as the dynamic authentication chain is being generated;
  challenge the user with the dynamic authentication chain in a single login request;
  receive a set of credentials from the user based at least in part on the order of the dynamic authentication chain in response to the single login request;
  determine whether the set of credentials satisfies the dynamic authentication chain;
  authenticate the user in response to determining that the set of credentials satisfies the dynamic authentication chain;
  adapt to re-challenge the user with a stronger authentication scheme when a highly protected resource is being accessed; and
  analyze criteria for failure and re-challenge the user in response to determining that the set of credentials fails to satisfy the dynamic authentication chain.

14. The computer system of claim 13, wherein generate the dynamic authentication chain comprises:
evaluate a plurality of source parameters of the user; and
dynamically select the plurality of authentication schemes to be included in the dynamic authentication chain.

15. The computer system of claim 14, wherein the plurality of authentication schemes are dynamically selected from a pre-defined list of authentication schemes.

16. The computer system of claim 13, wherein generate the dynamic authentication chain further comprises: dynamically select the particular order in which the plurality of authentication schemes are arranged in the dynamic authentication chain.

17. The computer system of claim 13, wherein a plurality of source parameters of the user comprises at least one of user access history, role specific access, or privilege access control.

18. The computer system of claim 13, further comprising analyze criteria for failure and re-challenging the user in a new single login request based on a pre-defined list of authentication schemes in response to determining that the set of credentials fails to satisfy the dynamic authentication chain.

* * * * *

UNITED STATES PATENT AND TRADEMARK OFFICE
CERTIFICATE OF CORRECTION

| | |
|---|---|
| PATENT NO. | : 11,057,362 B2 |
| APPLICATION NO. | : 15/725536 |
| DATED | : July 6, 2021 |
| INVENTOR(S) | : Murali Krishna Segu et al. |

It is certified that error appears in the above-identified patent and that said Letters Patent is hereby corrected as shown below:

In the Claims

Column 9, Line 48 (Claim 1): Replace "generating, based on evaluation of a plurality parameters-", with --generating, based on evaluation of a plurality of parameters--.

Signed and Sealed this
Twentieth Day of September, 2022

Katherine Kelly Vidal
*Director of the United States Patent and Trademark Office*